3,398,126
PROPYLENE OXIDE-BUTADIENE MONOXIDE COPOLYMERS CROSS-LINKED WITH MALEIC ANHYDRIDE
Michael J. Skrypa, Camillus, N.Y., assignor to Allied Chemical Corporation, New York, N.Y., a corporation of New York
No Drawing. Filed Mar. 24, 1965, Ser. No. 442,531
6 Claims. (Cl. 260—78.5)

ABSTRACT OF THE DISCLOSURE

This invention relates to new thermoset cross-linked resins of a propylene oxide-butadiene monoxide copolymer, cross-linked with maleic anhydride. The propylene oxide-butadiene monoxide copolymer contains 1 to 13 allylic groups, preferably 4 to 8 allylic groups per 100 grams of copolymer. Maleic anhydride is employed in a proportion of about 0.25 to 3 mols, preferably 0.9 to 3 mols, with an especially preferred range of 1.1 to 1.3 mols, per double bond in the copolymer. The cross-linked propylene oxide-butadiene monoxide copolymers are advantageously employed as castings, laminates, surface coatings, and adhesive agents which are resistant to chipping, cracking, and atmospheric degradation even at elevated temperatures.

Heretofore, propylene oxide-butadiene monoxide copolymers have been prepared as thermoplastic materials which are either liquid, semi-solid or solid materials. As may readily be seen, liquid and semi-solid propylene oxide-butadiene monoxide copolymers are severely limited in the area of their industrial application and may be utilized as lubricating agents and the like. Solid propylene oxide-butadiene monoxide copolymers, on the other hand, possess minimum thermal stability and are readily susceptible to chipping and cracking under minimum load due to inherent brittleness and excessive rigidity.

An object of the present invention is to provide a new thermoset copolymer derived from propylene oxide-butadiene monoxide copolymer. A further object is to provide processes for the preparation of this thermoset copolymer. Other objects and advantages will become apparent from the following description.

In accordance with the present invention a thermoset copolymer may be prepared by admixing and reacting propylene oxide - butadiene monoxide copolymer with maleic anhydride in the presence of an organic peroxide. Propylene oxide-butadiene monoxide copolymer when reacted with maleic anhydride produces a thermoset copolymer possessing outstanding thermal stability and tensile and flexural strength. Due to these chemical and physical properties, the thermoset propylene oxide-butadiene monoxide copolymer of the present invention may be advantageously employed as casting, potting, laminating, surface coating, or adhesive agents which are, in turn, resistant to chipping, cracking and atmospheric degradation even at elevated temperatures.

Propylene oxide-butadiene monoxide copolymers utilized in the present invention, have the probable recurring unit of the formula:

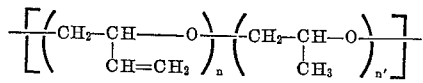

wherein $n$ and $n'$ are integers from about 1 to 20, and in successive recurring units $n$ and also $n'$ generally will have different values from one unit to the next. Moreover, these values of $n$ and $n'$ will be limited to allow only copolymers having molecular weight of from about 150 to 2,000 and having between 1 to 13 inclusive allylic groups per 1000 grams. Generally speaking, copolymers having a molecular weight up to at least about 1,500 are in the liquid state.

The molar ratio of propylene oxide to butadiene monoxide may vary over a wide range and the selection of any particular ratio is normally dictated by the properties desired, i.e., the number of allylic linkages present. This molar ratio usually falls within the range of 3 to 1 mols propylene oxide per mol butadiene monoxide. Since, however, the butadiene monoxide reactant is of substantially lower reactivity than is the propylene oxide reactant, it is preferred to employ an excess of butadiene monoxide in order to incorporate the desired amount of this reactant in the resulting copolymer. Use of the above particular molar ratio range results in propylene oxide-butadiene monoxide copolymer which contains from about 4 to 8 allylic groups per 1000 grams of mass.

The molecular weight of the copolymer is controlled by the amount of initiator employed. Illustrative of suitable initiators are ethylene glycol, propylene glycol, glycerol and pentaerythritol. A mol of initiator is employed for every mol of polymer desired.

The reaction of propylene oxide and butadiene monoxide is generally carried out in the presence of a catalyst. Illustrative of suitable catalysts are: the alkali metal hydroxides such as potassium, sodium and lithium hydroxides; organic amines such as ethylenediamine and ethanolamine; and fluoboric acid.

The amount of catalyst is not critical, from about 0.25 to 1%, preferably 0.3 to 0.5%, based upon the total amount of the reactants may be employed.

Reaction temperatures from about 75° C. to 125° C. and preferably 85° C. to 95° C. may be utilized. Since both propylene oxide and butadiene oxide possess relatively low boiling points (35° C. and 67° C., respectively) the reaction is preferably carried out in a closed vessel. Autogenous pressures developed in the closed reaction vessel at the beginning of reaction range from about 30 to 60 p.s.i.g. Reaction times vary somewhat with the temperature employed but usually fall within the range of from about 15 to 100 hours and generally 24 to 65 hours.

Purification of the resulting propylene oxide-butadiene monoxide copolymer may be effected by utilizing conventional procedures. For example, the copolymer may be taken up in a suitable solvent such as n-hexane, heptane or propyl ether and washed with a dilute mineral acid such as hydrochloric, sulfuric or phosphoric acid. The resulting solution is then allowed to stand in order to effect gravitational separation of the organic phase from the aqueous phase, whereupon the aqueous phase is drawn off and discarded and the remaining organic phase water-washed in order to effect removal of trace amounts of the neutralization agent and by-product salts. The purified copolymer may be then isolated by distilling off the solvent and any trace amount of water.

Reaction of propylene oxide-butadiene monoxide copolymers with maleic anhydride is carried out in the presence of an organic peroxide. Suitable peroxides include dialkyl peroxides, alkyl hydroperoxides, peresters and ketone peroxides. Illustrative of suitable organic peroxides are di-t-butylperoxide, di-cumyl-peroxide, t-butyl hydroperoxide, t-butyl perbenzoate, and methyl ethyl ketone peroxide. The amount of organic peroxide employed is not critical and normally falls within the range of from about 0.75 to 3% and preferably 1.0 to 1.5% based on the total amount of the reactants.

Maleic anhydride is a solid which has a melting point 53° C. and possesses the structural formula:

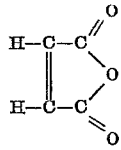

The amount of maleic anhydride utilized in rendering the propylene oxide-butadiene monoxide copolymer is normally determined by the degree of unsaturation present in the copolymer which may be readily ascertained by employing conventional and analytical tests such as determination of the iodine number or bromine number (ASTM D–1158). Upon determining the degree of unsaturation in terms of number of double bonds per 1000 grams copolymer, a molar ratio of from about 0.25 to 1.0 mol maleic anhydride per double bond (as previously determined) are employed. For best results, it is preferred to employ a molar ratio of from about 0.9 to 3, preferably 1.1 to 1.3 mols maleic anhydride per double bond contained in the copolymer. Since the preferred molecular weight of the copolymer falls within the range of 150 to 2,000, the number of double bonds present is usually from about 1 to 8.

The temperature at which maleic anhydride and propylene oxide-butadiene monoxide copolymer are admixed is not critical, however, a minimum temperature of from about 53° C. is desirably employed to induce some degree of homogenity of the mixture. The curing temperature at which maleic anhydride reacts with propylene oxide-butadiene monoxide copolymers to produce thermoset resins depends on the nature of the peroxide catalyst employed, the mass and shape of the reaction system, and the curing time desired. Generally speaking, curing temperatures from about 100° to 160° C. with curing times from about 24 to 48 hours have been found suitable.

In preferred operation, propylene oxide-butadiene monoxide copolymer having a molecular weight within the range of from about 150 to 2,000 is admixed with maleic anhydride in a ratio of from about 1.1 to 1.3 mols per double bond contained in the copolymer molecule, 1 to 3% dicumyl peroxide and heated to a temperature within the range of from about 100 to 160° C. for a period of 24 to 48 hours.

The following examples are given for the purpose of illustrating the present invention and are not to be deemed a limitation thereof.

Example 1.—Preparation of propylene oxide-butadiene monoxide copolymer

To a closed autoclave was charged 387 parts butadiene monoxide, 290 parts propylene oxide, 29.5 parts propylene glycol, and 2.8 parts potassium hydroxide. The resulting reaction mixture was heated to a temperature range of 85° to 95° C. for a period of 54 hours. At the end of this period, the pressure was 14″ Hg vacuum.

A yield of 650 parts propylene oxide-butadiene monoxide copolymer, corresponding to a yield of 91.7% of theory, was obtained. Crude propylene oxide-butadiene monoxide copolymer was taken up with an equal volume of n-hexane, one-half volume of water and concentrated HCl in an amount sufficient to neutralize the potassium hydroxide catalyst. The resulting mixture was vigorously agitated for 0.5 hour and allowed to stand to effect the gravitational separation of the two phases. The aqueous phase was water-washed six times in order to remove any trace amount of potassium hydroxide or by-product salt. n-Hexane and water were finally removed by vacuum distillation, and 615 parts of purified propylene oxide-butadiene monoxide copolymer were recovered. The resulting copolymer was tested by standard iodine and mercuric acetate analysis for olefin content, the results of which showed about 7 double bonds per 1000 grams of copolymer.

Example 2.—Reaction with maleic anhydride

A propylene oxide-butadiene monoxide copolymer was prepared substantially in accordance with the procedure set forth in Example 1. The resulting copolymer had a molecular weight of 1,400 and 3.8 double bonds per 1000 grams of copolymer. Analysis showed that the copolymer so prepared had a mol composition of 73.4 mol percent propylene oxide and 26.6 mol percent butadiene monoxide.

A reaction mixture comprised of 100 grams copolymer and 440 parts maleic anhydride, which is equivalent to 1.18 mols maleic anhydride per double bond of copolymer and 18.4 parts of dicumyl peroxide was prepared and heated to a temperature of slightly above 50° C. until the maleic anhydride dissolved. At the end of this period, the reaction product was poured into a heated Teflon mold to prepare a casting. The casting was cured at 110° C. for 15 hours, and post cured at 160° C. for 4 hours. The cast resin was tested analytically, the results of which are contained in Table I below:

| Cast Resin Properties | Results | A.S.T.M. Test Method |
|---|---|---|
| Physical Properties: | | |
| Tensile Strength, p.s.i. | 5,440 | D-628, D-651 |
| Ultimate Elongation, percent | 4.7 | D-638 |
| Flexural Strength, p.s.i. ×10³ | 11.7 | D-790 |
| Modulus of Elasticity, p.s.i. ×10³ | 688 | D-695 |
| Compressive strength, p.s.i. ×10³ | 27.4 | D-695 |
| Impact, Izod (ft. lb./in. notch) | 0.49 | D-256 |
| Hardness, Barcol 934-1 | 10 | |
| Heat distortion temperature, 264 p.s.i. fiber stress, ° C | 66 | D-648 |
| Water absorption, 24 hrs. at room temperature, wt. percent | 1.41 | D-570 |
| Percent shrinkage on curing at 60° C | 11.4 | |
| Refractive index, 25° C | 1.5090 | |
| Specific gravity, 25° C | 1.2184 | |
| Electrical properties: | | |
| Dielectric strength, volts/mil | 490 | D-149 |
| Volume resistivity, ohm-cm | 2×10¹⁴ | D-257 |
| Dielectric constant | | D-150 |
| 100 cycles | 4.5 | |
| 1 kilocycle | 4.2 | |
| 10 kilocycles | 4.0 | |
| 100 kilocycles | 3.8 | |
| 1 megacycle | 3.6 | |
| 10 megacycles | 3.3 | |
| Dissipation factor | | D-150 |
| 100 cycles | 0.031 | |
| 1 kilocycle | 0.036 | |
| 10 kilocycles | 0.044 | |
| 100 kilocycles | 0.050 | |
| 1 megacycle | 0.051 | |
| 10 megacycles | 0.041 | |

Example 3

A propylene oxide-butadiene monoxide copolymer was prepared substantially in accordance with the procedure set forth in Example 1 and analysis showed that this copolymer possessed a molecular weight of 1,130, 7.6 double bonds per 1000 grams and a mol percent composition of 46.8 propylene oxide and 53.2 mol percent butadiene monoxide.

1000 parts of copolymer so produced were admixed with 872 parts maleic anhydride and 18.7 parts dicumyl peroxide, heated at 50° C. and poured into a Teflon mold in order to produce a casting. After a period of 48 hours at 100° C. and an additional 4 hours at 160° C., the resulting cast was tested analytically, the results of which are contained in Table II set forth below:

TABLE II

Cast resin properties: Results
Physical properties:
  Tensile strength, p.s.i. _____ 7730
  Utimate elongation, percent _____ 2.1
  Flexural strength, p.s.i.×10³ _____ 16.3
  Modulus of elasticity, p.s.i.×10³ _____ 750
  Compressive strength, p.s.i.×10³ _____ 16.3
  Impact, Izod (ft. lb./in. notch) _____ 0.27
  Hardness, Barcol 934–1 _____ 48
Heat distortion temperature:
  264 p.s.i. fiber stress, ° C. _____ 86
Water absorption, 24 hours at room temperature, wt. percent _____ 1.58
Percent shrinkage on curing _____ 11.4
Refractive index, 25° C. _____ 1.5178
Specific gravity, 25° C. _____ 1.3238

(Test methods employed are the same as those listed in Table I.)

Example 4

The copolymer-maleic anhydride-dicumyl peroxide reaction mixture utilized in Example 2 was heated to slightly above 50° C. to dissolve the maleic anhydride and spread onto surface coating test panels. The coating was heated under infrared heat lamps at a temperature of from 100° C.–120° C. for a period of 16 hours, followed by additional heating at 160° C. for an additional 4 hours. At the end of this period, coatings so produced were analyzed, the results of which are contained in Table III set forth below:

TABLE III

Physical properties: Results
  Thickness, mils _____ 0.39–2.84.
  Appearance _____ Glossy and clear.
  Pencil hardness _____ 7H.
  Sward hardness _____ 24.
  Elongation (conical mandrel), percent _____ 29.0.
  Impact resistance, in.-lb., direct _____ 30.

In addition, the above resin was subjected to infrared absorption tests which showed strong intensity at 5.63 and 5.80 bands indicating the presence of acid anhydride and ester type carbonyl groups respectively, minimum absorption bands at 3.88–3.55 showing C-H and acid anhydride groups, minimum intensity over the broad range of 9.00–9.40 indicating the presence of C-O-C groups and, finally, weak intensity at 6.92 absorption band indicating the presence of methylene groups.

Example 5

A propylene oxide-butadiene monoxide copolymer was prepared substantially in accordance with the procedure set forth in Example 1 and comprised a molecular weight of 1,275 and found to contain 7.3 double bonds per 1000 grams. This copolymer was admixed with maleic anhydride in a mol ratio of 1.18 anhydride per double bond contained in the copolymer molecule as described above and with 1% dicumyl peroxide. The system was heated to slightly above 50° C. to dissolve the maleic anhydride and spread onto surface coating test panels. The coating was cured or dried as described under Example 4. Again, the resulting coating was subjected to analysis, the results of which are contained in Table IV set forth below:

TABLE IV

Physical properties: Results
  Thickness, mils _____ 0.79–1.34.
  Appearance _____ Glossy and clear.
  Pencil hardness _____ 7H.
  Elongation (conical mandrel), percent _____ 43.
  Impact resistance, in lb., direct _____ 29.7.
  Chemical resistance (hrs. to failure):
    Sodium hydroxide (5 percent) _____ 2.
    Acetic acid (10 percent) _____ 3.
    Distilled water _____ 90.

It is to be understood that the foregoing is by way of illustration and that changes and modifications may be made within the scope of the appended claims without departing from the spirit of the invention.

I claim:
1. A process for the preparation of a solid thermoset composition which comprises admixing propylene oxide-butadiene monoxide copolymer having a molecular weight of from about 150 to 2000 and having between 1 and 13 inclusive allylic groups per 1000 grams with maleic anhydride in a proportion of from about 0.25 to 3 mols maleic anhydride per double bond of said copolymer in the presence of an organic peroxide to produce a thermoset resinous composition.

2. A process in accordance with claim 1, wherein the proportion of maleic anhydride to propylene oxide-butadiene monoxide copolymer is from about 1.1 to 1.3 mols maleic anhydride per mol double bond of said copolymer.

3. A process in accordance with claim 1, wherein the reaction temperature is from about 100 to 175° C.

4. A solid thermoset composition which is the reaction product of propylene oxide-butadiene monoxide copolymer having a molecular weight of from about 150 to 2000 and having between 1 to 13 inclusive allylic groups per 1000 grams with maleic anhydride in a proportion of from about 0.25 to 3 mols maleic anhydride per mol per double bond of said copolymer.

5. A solid thermoset resinous composition which is the reaction product of propylene oxide-butadiene monoxide copolymer having a molecular weight of from about 750 to 1600 and having between 4 to 8 allylic groups per 1000 grams with maleic anhydride in a proportion of from about 1.1 to 1.3 mols maleic anhydride per double bond of said copolymer to produce a resinous composition.

6. The thermoset composition of claim 4 wherein the proportion of maleic anhydride to the copolymer is from 0.9 to 3 mols maleic anhydride per mol double bond of said copolymer.

References Cited

UNITED STATES PATENTS 3,031,439 4/1962 Bailet _____ 260—79.3
3,261,874 7/1966 Stogryn et al. _____ 260—615
3,321,430 5/1967 Ott et al. _____ 260—876

FOREIGN PATENTS 1,324,542 4/1963 France.

MURRAY TILLMAN, *Primary Examiner.*

J. T. GOOLKASIAN, *Assistant Examiner.*